Figure 1:
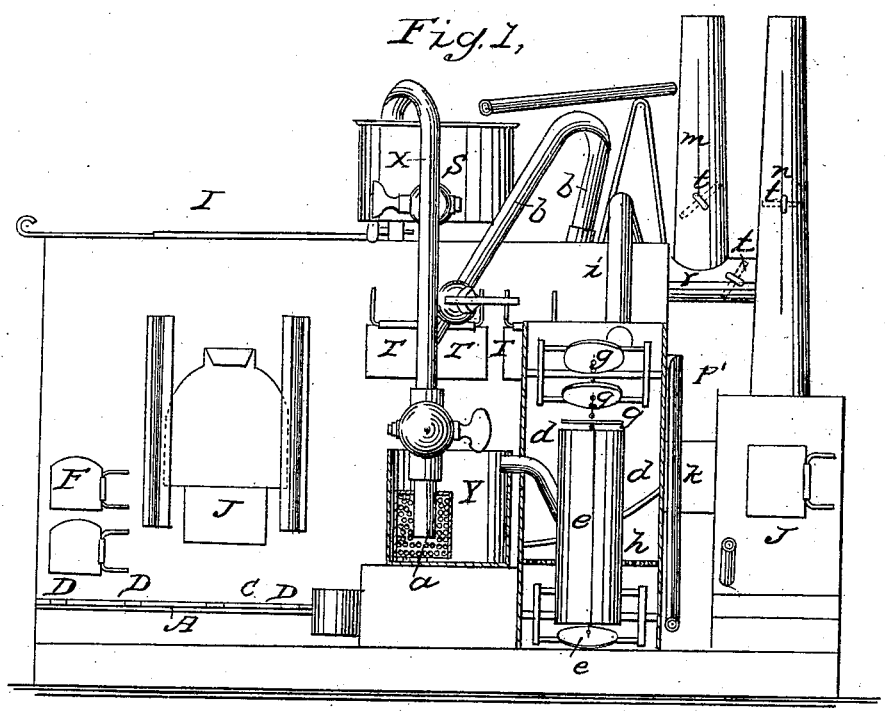

T. W. DRESSER.
Quicksilver Furnace.

No. 85,371.

2 Sheets—Sheet 1.

Patented Dec. 29, 1868.

WITNESSES
John H. Moore
Chas. Shurt.

INVENTOR
Thomas W. Dresser

T. W. DRESSER.
Quicksilver Furnace.
No. 85,371. Patented Dec. 29, 1868.
Fig. 3,
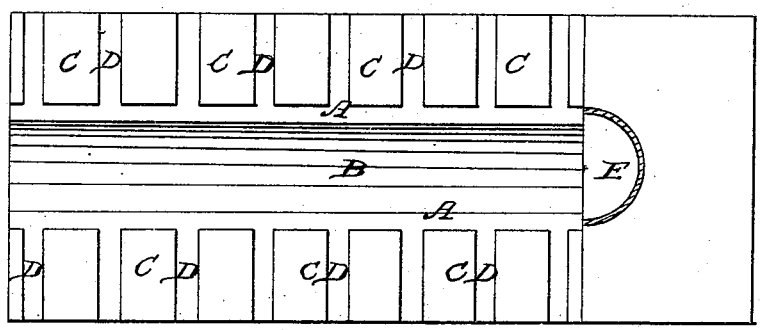
Fig. 4,
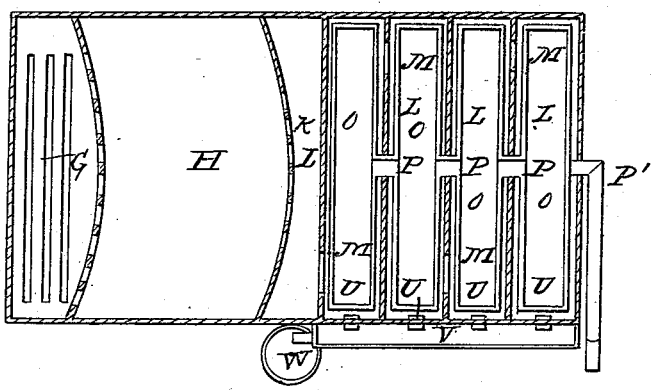
Fig. 5,
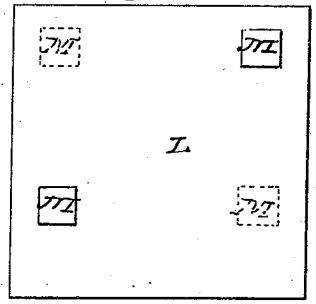
WITNESSES
John R. Moore
Chas Silvet
INVENTOR
Thomas W Dresser

United States Patent Office.

THOMAS W. DRESSER, OF SAN FRANCISCO, CALIFORNIA.

Letters Patent No. 85,371, dated December 29, 1868.

IMPROVED QUICKSILVER-FURNACE AND CONDENSER.

The Schedule referred to in these Letters Patent and making part of the same.

*To all whom it may concern:*

Be it known that I, THOMAS W. DRESSER, of the city and county of San Francisco, State of California, have invented an Improved Quicksilver-Furnace and Condenser; and I do hereby declare the following description and accompanying drawings are sufficient to enable any person skilled in the art or science to which it more nearly appertains, to make and use my said invention or improvements without further invention or experiment.

The object of my invention is to provide an improved furnace and condenser, for the reduction of quicksilver, and other ores of a similar nature, so that the whole operation is conducted with a very small loss of the vapor, which, together with the gases generated by the heat of the furnace, is drawn and forced through tanks of water, thus effectually condensing all that is capable of it, before the residue is allowed to escape by the flues.

It also relates to an improved method of constructing the foundation, so that the waste which usually occurs, by the quicksilver passing through the foundation, is effectually avoided, and the whole operation is rendered more economical.

This is effected by constructing a foundation, upon which I place a double-inclined plane, of iron or other impervious metal, the two planes meeting and forming a trough in the centre, by which any escaping quicksilver is carried to a receiver. The planes may be plastered and polished, and used with or without the iron.

Above this, the furnace is finished with a grate, for fire, a chamber for the ore, over and through which the heat passes, and a vapor-chamber, with diaphragms or walls extending across it at intervals. These walls have openings, alternately on one side and the other, and a series of troughs between them, through which water is constantly passing.

Above the furnace is placed a tank of water, with a siphon-tube leading from it to another tank below. A tube, leading from the top of the vapor-chamber, enters this siphon-tube, and the water, passing down the former, draws and forces the quicksilver-vapor into the lower tank, in which and during its passage it is completely condensed.

Still another chamber is so arranged and connected with the lower siphon-tank as to take the water, and lead it into an upright tube, about one-third of the distance from the top, so that the weight of the water acts on a series of buckets on an endless chain, and forces them down, each carrying with it a portion of vapor, drawn from the principal chamber, and condensing it, thus doing about double the work that the siphon would do alone.

The escape-flues have a series of valves or dampers for stopping or changing the direction of the escaping gases, while a final condenser is constructed at the base of the chimney.

To more fully explain my invention, reference is had to the accompanying drawings, forming a part of this specification, of which—

Figure 1, sheet 1, is a side elevation of my furnace, with a section of the condensers.

Figure 2:
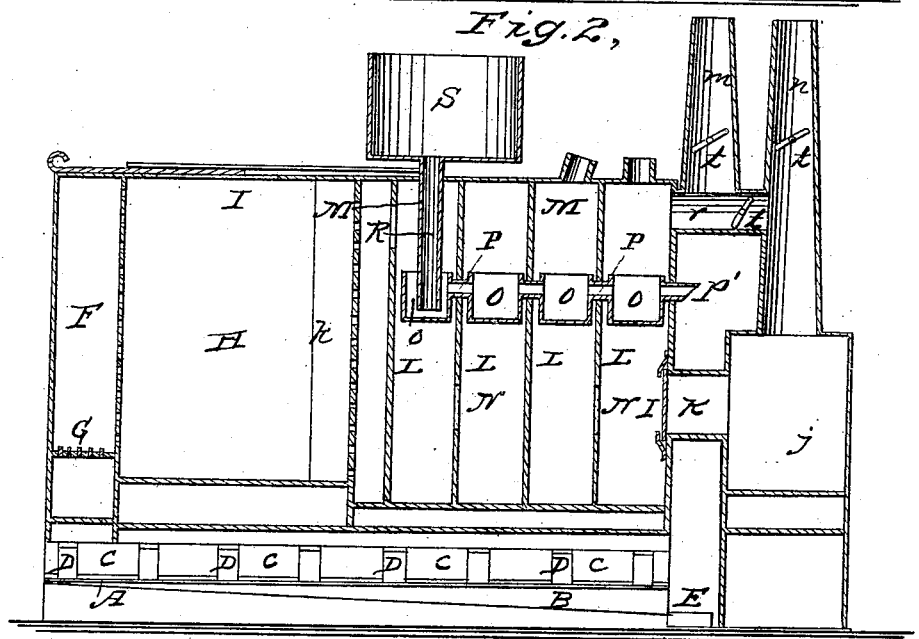

Figure 2, sheet 1, is a side sectional elevation of the furnace.

Figure 3, sheet 2, is a plan of the foundation-plates.

Figure 4, sheet 2, is a horizontal sectional view of the furnace.

Figure 5, sheet 2, shows one of the cross-walls or partitions of the valve-chamber.

Similar letters of reference in each of the figures indicate like parts.

A A, fig. 3, are plates of iron, which are laid on the foundation, and slightly inclined towards each other, their inner edges terminating in a trough or channel, B, or the foundation may be plastered and polished, if desired.

C C represent the first course of masonry for the superstructure, which is to be built upon these iron plates or polished walls.

By this device, all quicksilver which may pass from the furnace will be collected in the passages D D, between the courses, and carried to the chamber or channels B, and thence to a receiving-tank, E, where it is collected.

The upper part of the furnace consists of the fire-place F, the fuel being placed on the grate G.

The ore is fed into the ore-chamber H through the door I, and may be removed, after the operation is complete, by the door J.

The chamber being suitably charged, the heat from the fire passes through and over the ore in the chamber, and the mercurial vapor and other gases are carried through the perforated wall K into the vapor-chamber.

This chamber is divided by walls, L L L L, into compartments, as shown.

Near the top, these walls are pierced, as shown at figs. 4 and 5, M M, alternately on one side and on the other, so that the heated vapor shall traverse as much space as possible in its passage.

To allow a circulation of the lower and cooler strata, without mixing the whole, I construct similar openings, N, near the bottom of the chamber.

Between the walls L L, and near the openings M, are placed troughs O O, extending entirely across the chamber, and connected by passages P P, through the partition-walls.

An outer pipe, P', serves to discharge the surplus water.

The water is fed into the first trough by a pipe, R, fig. 2, from the main supply-tank S.

Close doors, T T, are so placed as to allow a convenient cleaning of the troughs.

At the bottom of the vapor-chamber is a series of discharge-pipes, U U, fig. 4, which empty into the receiving-trough V, and then into a tank, W.

From the tank S, a bent or siphon-tube, X, leads downward into the vessel Y, where it discharges within the perforated cylinder a.

A pipe, b, from the top of the vapor-chamber, enters the pipe X in such a manner that the flowing water in the latter surrounds the mouth of b, and creates a vacuum, which must be filled by vapor from the chamber. This is carried down with the water, and, during its passage, the valuable part is condensed, and deposited in the vessel Y.

A pipe, c, leading from near the top of this vessel, enters the chamber d, and passes downward a short distance, as shown, where it opens into a cylinder, e.

A series of buckets, g g, on an endless chain, is acted upon by this water, and carried down by its weight, while each one, on entering the cylinder, carries with it a portion of mercurial vapor, which is condensed by the water in the cylinder and at the bottom of the chamber, after which the air and refuse gases are permitted to escape through the perforated plate h, which is, at all times, below the surface of the water.

The vapor is supplied by a pipe, i, from the vapor-chamber, a vacuum being caused by the action of the buckets g.

The endless chain, with its buckets, passes over rollers, at the top and bottom, as shown in fig. 1.

The lower part of the vapor-chamber communicates with a condenser, j, at the base of the chimney, by a passage, K, which is regulated by a valve or damper, I.

The upper part of the chamber communicates with the two escape-flues or chimneys m n by a passage, r.

The three valves or dampers t t t serve to close the passages, or to regulate them, at pleasure.

By constructing a furnace and condenser in this manner, I have one which is economical, and in which I save nearly all the mercury, and with no loss, by leakage through the foundation, as is always the case when constructed of stone or brick, as in ordinary furnaces.

Having thus described my invention,

What I claim, and desire to secure by Letters Patent, is—

1. The separating-walls L L in the vapor-chamber, with the upper connecting-passages M M, and lower passages N N, together with the condensing-troughs o o, the whole constructed and operated substantially as and for the purpose described.

2. The siphon water-pipe X, and the pipe b from the vapor chamber, or equivalent device, for withdrawing the vapor by means of a vacuum, and condensing it in its passage, substantially as herein described.

3. The cylinder e, with the buckets g, operating as shown, for producing a vacuum and forcing the vapor beneath the water in the chamber d, and the vapor-pipe i, constructed and operated substantially as and for the purpose described.

4. The two flues m and n, with the dampers t t t, for regulating the draught, or, by closing them entirely, to cause a draught through the siphon-tube, and the condensing-chamber j, substantially as described.

5. Constructing the foundation, with the inclined impervious plates A A and the channels D between the courses, together with the collecting-channel B, substantially as and for the purpose described.

6. A draught, as created by the siphon-tube X, the endless chain and its buckets g g, or equivalent device, for condensing the vapors and gases which escape from chemical works, for retorting gold and silver amalgams, and for withdrawing and condensing gold that would be lost in melting and refining, substantially as herein described.

In witness whereof, I have hereunto set my hand and seal.

THOMAS W. DRESSER. [L. S.]

Witnesses:
  JOHN H. MOORE,
  CHAS. SILENT.